US012808725B2

United States Patent

(12) United States Patent
Zhou et al.

(10) Patent No.: US 12,808,725 B2
(45) Date of Patent: Nov. 24, 2026

(54) TEMPERATURE SENSOR SYSTEM IN CHIP AND CHIP

(71) Applicants: Beijing Youzhuju Network Technology Co., Ltd., Beijing (CN); Lemon Inc., Grand Cayman (KY)

(72) Inventors: Yujie Zhou, Beijing (CN); Weifeng Dong, Beijing (CN); Mingqi Hu, Beijing (CN); Shan Lu, Los Angeles, CA (US); Jian Wang, Beijing (CN)

(73) Assignees: Beijing Youzhuju Network Technology Co., Ltd., Beijing (CN); Lemon Inc., Grand Cayman (KY)

( * ) Notice: Subject to any disclaimer, the term of this patent is extended or adjusted under 35 U.S.C. 154(b) by 304 days.

(21) Appl. No.: 18/414,838

(22) Filed: Jan. 17, 2024

(65) Prior Publication Data

US 2024/0240993 A1 Jul. 18, 2024

(30) Foreign Application Priority Data

Jan. 18, 2023 (CN) ......................... 202310084788.8

(51) Int. Cl.
*G01K 7/01* (2006.01)
*G01K 1/02* (2021.01)
*G01K 1/14* (2021.01)

(52) U.S. Cl.
CPC ............... *G01K 7/01* (2013.01); *G01K 1/026* (2013.01); *G01K 1/14* (2013.01)

(58) Field of Classification Search
CPC ............. G01K 7/01; G01K 1/026; G01K 1/14
See application file for complete search history.

(56) References Cited

U.S. PATENT DOCUMENTS

| | | | | |
|---|---|---|---|---|
| 10,371,583 | B1 | 8/2019 | Pan et al. | |
| 11,538,738 | B1 | 12/2022 | Tuncer | |
| 2005/0151213 | A1 | 7/2005 | Casey et al. | |
| 2014/0376595 | A1 | 12/2014 | Daley et al. | |
| 2015/0026534 | A1 | 1/2015 | Whetsel | |
| 2018/0045580 | A1 * | 2/2018 | Merrikh | G01K 7/021 |

(Continued)

FOREIGN PATENT DOCUMENTS

| | | | |
|---|---|---|---|
| CN | 102004005 | A | 4/2011 |
| CN | 107331661 | A | 11/2017 |

(Continued)

OTHER PUBLICATIONS

Taiwan Patent Application No. 112102273; Office Action; dated Apr. 30, 2024; 14 (contains English Translation).

(Continued)

*Primary Examiner* — Lex H Malsawma
(74) *Attorney, Agent, or Firm* — BakerHostetler

(57) ABSTRACT

A temperature sensor system in a chip and the chip are provided. The temperature sensor system in the chip includes the first temperature sensing unit and a control unit. The first temperature sensing unit senses a temperature by using a back-end-of-line metal structure formed in a back-end-of-line process of the chip to output a temperature sensing electrical signal; and the control unit is coupled with the first temperature sensing unit, and processes the temperature sensing electrical signal output by the first temperature sensing unit to output a measurement result.

20 Claims, 8 Drawing Sheets

(56) References Cited

U.S. PATENT DOCUMENTS

| | | | | |
|---|---|---|---|---|
| 2020/0285418 | A1* | 9/2020 | Hara | G06F 3/0659 |
| 2021/0072095 | A1 | 3/2021 | Wang et al. | |
| 2021/0164845 | A1 | 6/2021 | Liu et al. | |

FOREIGN PATENT DOCUMENTS

| | | | |
|---|---|---|---|
| CN | 109642828 | A | 4/2019 |
| CN | 110553748 | A | 12/2019 |
| CN | 212303078 | U | 1/2021 |
| CN | 112945408 | A | 6/2021 |
| CN | 113793844 | A | 12/2021 |
| EP | 3658872 | B1 | 1/2022 |
| TW | 202130979 | A | 8/2021 |
| TW | I742613 | B | 10/2021 |

OTHER PUBLICATIONS

European Patent Application No. 24744235.3; Extended Search Report; dated Feb. 19, 2026; 9 pages.

European Patent Application No. 24744235.3; Office Action - Article 94(3); dated Sep. 14, 2026; 7 pages.

* cited by examiner

TEMPERATURE SENSOR SYSTEM IN CHIP AND CHIP

CROSS-REFERENCE TO RELATED APPLICATION

The present application claims priority of the Chinese Patent Application No. 202310084788.8, filed on Jan. 18, 2023, the disclosure of which is incorporated herein by reference in its entirety as part of the present application.

TECHNICAL FIELD

The embodiments of the present disclosure relate to a temperature sensor system in a chip and the chip.

BACKGROUND

The acquisition of an intra-chip temperature is generally implemented by an intra-chip temperature sensor system. Currently, the most commonly used temperature sensor system in the industry consists of a temperature sensing unit of a temperature sensor constituted by a bipolar junction transistor (BJT).

SUMMARY

At least one embodiment of the present disclosure provides a temperature sensor system in a chip. The temperature sensor system includes: the first temperature sensing unit, which senses a temperature by using a back-end-of-line metal structure formed in a back-end-of-line process of the chip to output a temperature sensing electrical signal; and a control unit, which is coupled with the first temperature sensing unit, and processes the temperature sensing electrical signal output by the first temperature sensing unit to output a measurement result.

For example, in the temperature sensor system provided by an embodiment of the present disclosure, a chip includes at least one die, and the first temperature sensing unit and the control unit are integrated in the same die of the at least one die; and the first temperature sensing unit is integrated in one of the at least one die and the control unit is independent of the at least one die.

For example, in the temperature sensor system provided by an embodiment of the present disclosure, the chip further includes a package portion. The first temperature sensing unit is integrated in one of the at least one die and the control unit is independent of the at least one die, which includes: the first temperature sensing unit being integrated in one of the at least one die and the control unit being provided in the package portion outside the die; or in the case where the chip includes a plurality of dies stacked by a bonding structure, the first temperature sensing unit is integrated in one of the at least one die and the first temperature sensing unit is provided in the bonding structure.

For example, in the temperature sensor system provided by an embodiment of the present disclosure, the temperature sensor system includes a plurality of temperature sensing units, and the plurality of temperature sensing units include the first temperature sensing unit. The temperature sensor system further includes a multiplexer, which is coupled with the control unit and the plurality of temperature sensing units, and is configured to select one of the plurality of temperature sensing units.

For example, in the temperature sensor system provided by an embodiment of the present disclosure, the at least one die includes a plurality of dies, and the multiplexer and the first temperature sensing unit are provided in the same die or are not provided in the same die.

For example, in the temperature sensor system provided by an embodiment of the present disclosure, the at least one die includes the first die, and the multiplexer is provided in the first die. In a case where the first temperature sensing unit is integrated in one of the at least one die and the control unit is independent of the at least one die, the multiplexer is coupled with the control unit through a package circuit structure of the first die.

For example, in the temperature sensor system provided by an embodiment of the present disclosure, the first die includes a signal output port, the multiplexer is coupled with the signal output port, and the signal output port is coupled with the package circuit structure, so that the multiplexer is coupled with the control unit.

For example, in the temperature sensor system provided by an embodiment of the present disclosure, the at least one die further includes the second die. The first die and the second die are stacked through a bonding structure and are packaged through the package circuit structure. The second die includes a signal output port, and the first die does not include a signal output port. The multiplexer is coupled with the signal output port through the bonding structure, and the package circuit structure is coupled with the control unit through the signal output port.

For example, in the temperature sensor system provided by an embodiment of the present disclosure, the at least one die includes a first die and a second die. In a case where the first temperature sensing unit and the control unit are respectively integrated in different dies of the at least one die: the first temperature sensing unit is provided in the first die, the control unit is provided in the second die, and a multiplexer in the first die is coupled with the control unit through an interconnect structure, wherein the interconnect structure is used to couple the first die and the second die; or the multiplexer in the first die is coupled with the control unit through a bonding structure, wherein the bonding structure is configured to stack the first die and the second die.

For example, in the temperature sensor system provided by an embodiment of the present disclosure, a chip includes the first die and the second die. In the case where the first temperature sensing unit is provided in the bonding structure, the control unit is provided in the first die or the second die, and the multiplexer is provided in the same die as the control unit; or the control unit is independent of the first die and the second die, the second die includes a signal output port, the multiplexer is provided in the second die, the signal output port is coupled with the package circuit structure, the multiplexer is coupled with the signal output port, and the signal output port is coupled with the package circuit structure, so that the multiplexer is coupled with the control unit via the package circuit structure.

For example, in the temperature sensor system provided by an embodiment of the present disclosure, the back-end-of-line metal structure includes at least one selected from the group consisting of a back-end-of-line metal wiring, a metal structure formed of a back-end-of-line metal via array and the back-end-of-line metal wiring, and a metal structure formed of the back-end-of-line metal wiring and a via array through a silicon substrate.

For example, in the temperature sensor system provided by an embodiment of the present disclosure, the control unit and the first temperature sensing unit form a 4-wire Kelvin-based circuit to process the temperature sensing electrical signal to output a measurement result.

At least one embodiment of the present disclosure provides a chip, and the chip includes the temperature sensor system provided by any one of the embodiments of the present disclosure.

BRIEF DESCRIPTION OF DRAWINGS

In order to clearly illustrate the technical solutions of the embodiments of the present disclosure, the accompanying drawings of the embodiments are briefly introduced below. Obviously, the accompanying drawings in the following description only relate to some embodiments of the present disclosure, but does not limit the present disclosure.

DETAILED DESCRIPTION

Figure 1A:
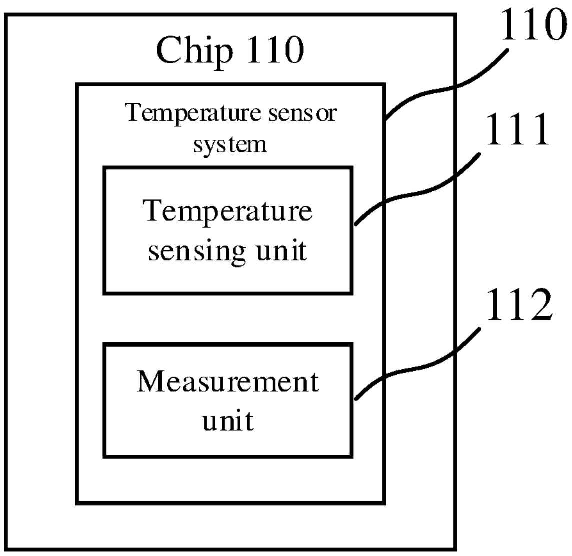
FIG. 1A illustrates a schematic diagram of a temperature sensor system in a chip provided by least one embodiment of the present disclosure.

In order to make the objects, technical solutions and advantages of the embodiments of the present disclosure clearer, the technical solutions of the embodiments of the present disclosure are clearly and completely described below in conjunction with the accompanying drawings of the embodiments of the present disclosure. Obviously, the described embodiments are part of the embodiments of the present disclosure, rather than all the embodiments. Based on the described embodiments of the present disclosure, all other embodiments obtained by those of ordinary skill in the art without creative labor belong to the protection scope of the present disclosure.

Unless defined otherwise, technical or scientific terms used in the present disclosure shall have their ordinary meanings that are understood by those of ordinary skill in the art to which the present disclosure belongs. The terms "first", "second", and the like, as used in this disclosure, do not denote any order, quantity, or importance, but are merely used to distinguish different components. Likewise, "a", "an", "the", and the like do not denote a limitation of quantity, but rather denote the presence of at least one. "Comprise" or "comprising" and the like means that the elements or items preceding the word encompass the elements or items listed after the word and their equivalents, but not excluding other elements or items. The terms "coupled" or "connected" and the like are not restricted to physical or mechanical couplings, but can include electrical couplings, whether direct or indirect. "Upper", "lower", "left", "right", and the like are merely used to indicate a relative positional relationship, which may be changed accordingly in the case where the absolute position of the described object is changed.

A temperature sensor system uses a temperature sensing unit of a temperature sensor to implement a temperature measurement of a position where the temperature sensing unit of a temperature sensor is provided. Therefore, the temperature measurement accuracy of a high-accuracy temperature sensor system is greatly related to the measurement accuracy of the temperature sensing unit of the temperature sensor. The temperature sensing unit of the temperature sensor consisting of a BJT is affected by the chip manufacturing process. Especially under advanced processes (e.g., FinFet 14 nm process and more advanced process nodes), the accuracy of the temperature sensing unit of the temperature sensor is gradually decreasing, which limits the overall accuracy of the temperature sensor system in the chip.

At least one embodiment of the present disclosure provides a temperature sensor system in a chip and the chip. The temperature sensor system in the chip includes the first temperature sensing unit and a control unit. The first temperature sensing unit senses a temperature by using a back-end-of-line metal structure formed in a back-end-of-line process of the chip to output a temperature sensing electrical signal. The control unit is coupled with the first temperature sensing unit and processes the temperature sensing electrical signal output by the first temperature sensing unit to output a measurement result. The temperature sensor system utilizes a back-end-of-line metal structure formed in the back-end-of-line process as a temperature sensing unit, which circumvents the fluctuation of the manufacturing process of the BJT in the front-end-of-line process, thereby improving the temperature measurement accuracy of the temperature sensor system and realizing the temperature measurement of the back-end-of-line structure in the chip.

FIG. 1A illustrates a schematic diagram of a temperature sensor system in a chip provided by at least one embodiment of the present disclosure.

As illustrated in FIG. 1A, the chip 100 includes a temperature sensor system 110. The temperature sensor system 110 includes a temperature sensing unit 111 and a control unit 112. The temperature sensing unit 111 is an example of the first temperature sensing unit.

The temperature sensing unit 111 senses a temperature by using a back-end-of-line metal structure formed in a back-end-of-line process of the chip to output a temperature sensing electrical signal.

For example, the manufacturing process of chips may be divided into a front-end process and a back-end process. For example, the process of implementing N-type and P-type field effect transistors (FET) on a silicon substrate, is referred to as a front-end-of-line (FEOL). For example, the front-end process may include photolithography, etchers, cleaners, ion implantation, chemical mechanical planarization, and the like. Corresponding to the front-end-of-line process is the back-end-of-line (BEOL) process. For example, the back-end-of-line process establishes several layers of conductive metal lines, which are connected between the different layers by the columnar metal. Back-end-of-line processes are used, for example, for packaging, including wiring, punching, etc. The back-end-of-line metal structure, for example, includes the back-end-of-line metal formed during a back-end-of-line process. For example, the back-end-of-line metal structure includes a back-end-of-line metal wiring, a pillar metal (Via) for coupling metal lines in different layers, and a through-silicon-via (TSV), etc. The through-silicon via makes a vertical conduction between chips and between wafers; and implements a vertical electrical interconnection of the through-silicon via and an interconnection between chips by filling with a conductive substance such as copper, tungsten, polysilicon, etc.

For example, the temperature sensing unit 111 includes a back-end-of-line metal wiring formed in a back-end-of-line process to utilize conductive metal lines for sensing a temperature. As another example, the first temperature sensing unit 111 includes a back-end-of-line metal wiring formed in a back-end-of-line process and a back-end-of-line metal via array formed by the columnar metal for coupling metal lines in different layers. As another example, the first temperature sensing unit 111 includes a back-end-of-line metal wiring formed in a back-end-of-line process and a via array of the through-silicon-via.

The embodiments of the present disclosure, based on a metal-type temperature sensing unit of a temperature sensor that can be constructed with a back-end-of-line metal wiring of any layer or a metal via array, implement a temperature measurement of multiple physical layer positions in a chip, as well as a temperature measurement in a 3D chip stack structure.

The embodiments of the present disclosure utilize the metal characteristics of the metal wiring in the back-end and the metal channel of the coupling via (e.g., pillar metal) for an accurate temperature measurement.

Figure 1B:
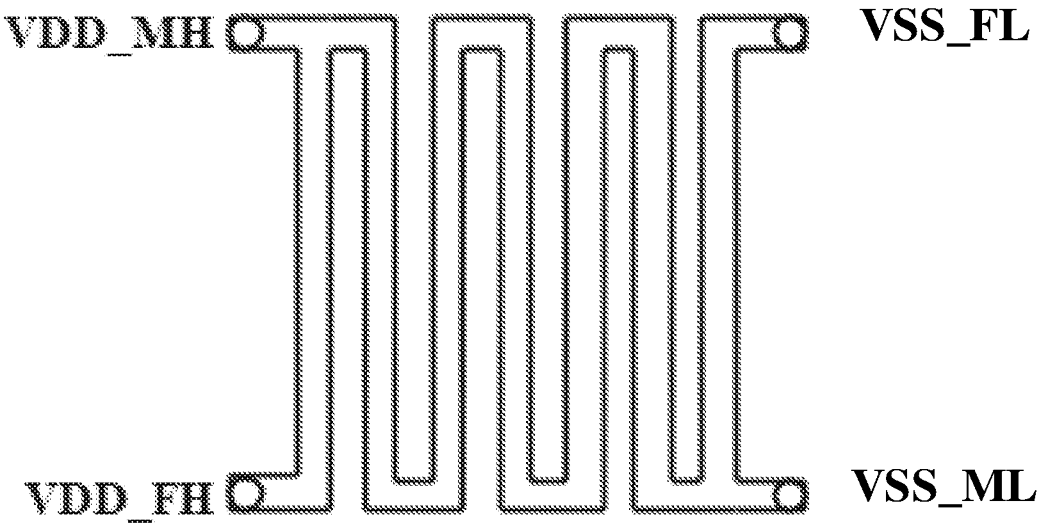
FIG. 1B illustrates a structural schematic diagram of a back-end-of-line metal provided by at least one embodiment of the present disclosure.
Figure 1C:
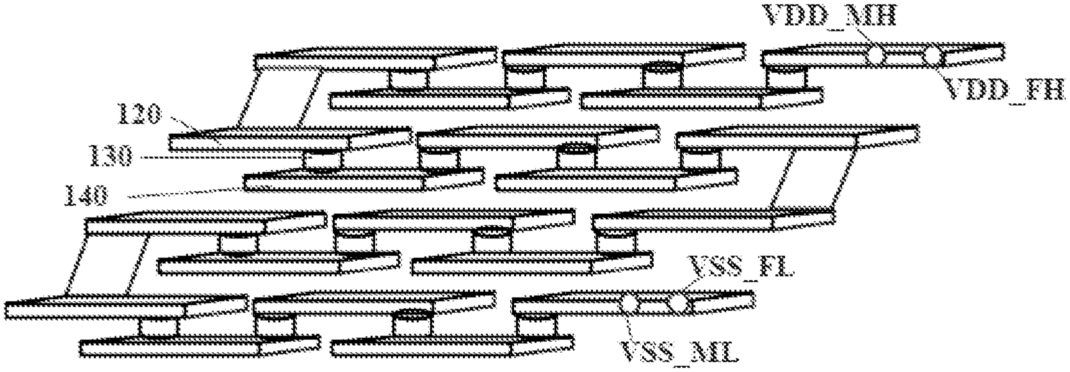
FIG. 1C illustrates a structural diagram of another back-end-of-line metal provided by at least one embodiment of the present disclosure.
Figure 1D:
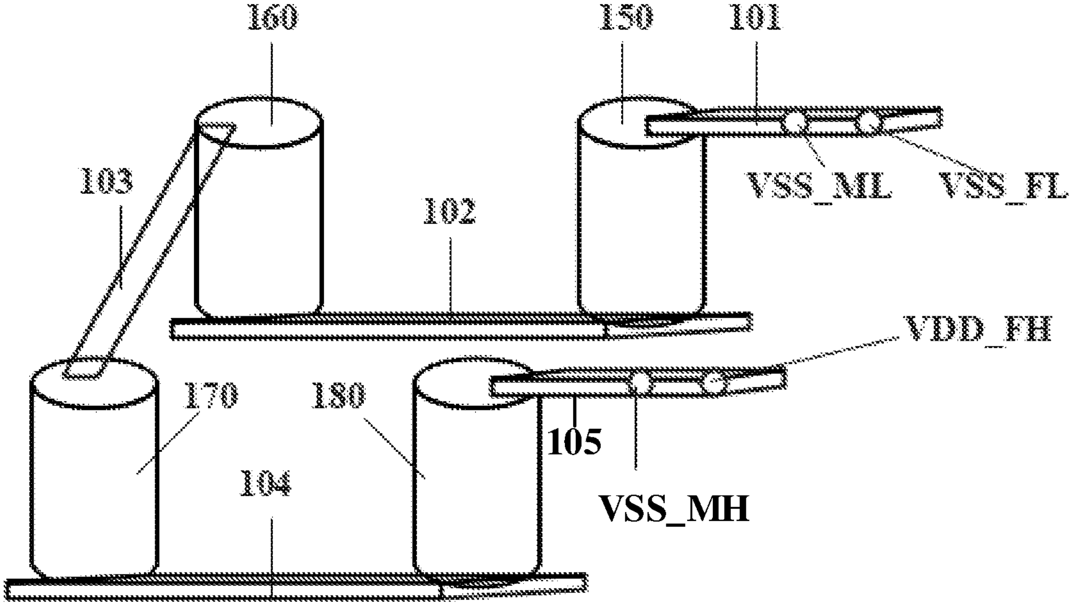
FIG. 1D illustrates a structural diagram of another back-end-of-line metal provided by at least one embodiment of the present disclosure.

FIG. 1B illustrates a schematic structural diagram of a back-end-of-line metal provided by at least one embodiment of the present disclosure. FIG. 1C illustrates a structural schematic diagram of another back-end-of-line metal provided by at least one embodiment of the present disclosure. FIG. 1D illustrates a structural schematic diagram of another back-end-of-line metal provided by at least one embodiment of the present disclosure.

As illustrated in FIG. 1B, in the example, the back-end-of-line metal structure is a metal wiring provided in a chip.

As illustrated in FIG. 1C, in the example, the back-end-of-line metal structure includes a metal wiring in the plurality of layers and a back-end-of-line metal via array. For example, the metal wiring 120 and the metal wiring 140 are metal wirings in different layers, and the metal wiring provided in one layer is illustrated as a parallelogram in FIG. 1C. A pillar metal 130 is configured to couple the metal wiring 140 and the metal wiring 120, and a plurality of pillar metals that are similar to the pillar metal 130 and configured to couple the metal wirings in different layers form a back-end-of-line metal via array.

As illustrated in FIG. 1D, the back-end-of-line metal structure includes a via array of the through-silicon via formed by a plurality of through-silicon vias (e.g., a through-silicon via 150, a through-silicon via 160, a through-silicon via 170, and a through-silicon via 180) and the metal wiring (e.g., a metal wiring 101, metal wiring 102, metal wiring 103, metal wiring 104, and metal wiring 105) that couples two through-silicon vias.

A control unit 112 is coupled with a temperature sensing unit 111, and processes a temperature sensing electrical signal output by the temperature sensing unit 111 to output a measurement result.

The control unit 112 may be, for example, an Analog-to-digital converter (ADC) module integrated on a chip. The ADC module implements the analog-to-digital conversion of data to implement a resistance measurement of the temperature sensor of the temperature sensing unit.

For example, the ADC module receives a temperature sensing electrical signal, and outputs a temperature measurement result according to the temperature sensing electrical signal. For example, the temperature sensing electrical signal includes a current and a voltage. The ADC module receives the current and the voltage, calculates a resistance value according to the current and the voltage, and obtains a temperature measurement result according to the relationship between the temperature and the resistance value illustrated in FIG. 2A.

Figure 2A:
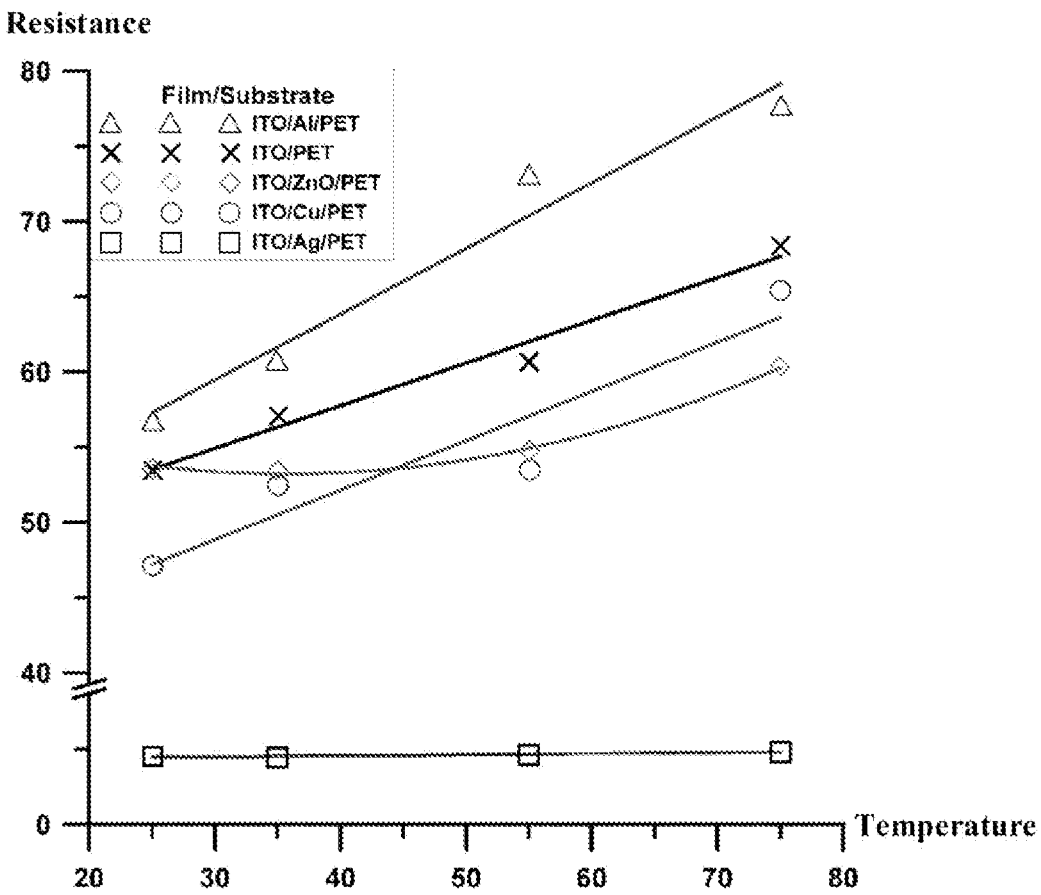
FIG. 2A illustrates a schematic diagram of a relationship between the resistance and temperature of a back-end-of-line metal.

FIG. 2A illustrates a schematic diagram of a relationship between the resistance and temperature of a back-end-of-line metal structure.

For example, FIG. 2A illustrates the variation of the resistance value of the back-end-of-line metal wiring provided in different film layers or substrate layers in a chip with the temperature varying. For example, the back-end-of-line metal structure may take a single-layer structure or a multi-layer (composite) structure, and taking the multi-layer structure may satisfy the constraint of the back-end-of-line wiring to the structure location of the metal temperature sensor. The following takes the back-end-of-line structure that uses a multi-layer structure as an example.

As illustrated in FIG. 2A, the resistance of the back-end-of-line metal wiring in the ITO/Ag/PET layer varies nearly linearly with the temperature, the resistance of the back-end-of-line metal wiring in the ITO/Cu/PET layer varies nearly linearly with the temperature, the resistance of the back-end-of-line metal wiring in the ITO/ZnO/PET layer varies nearly linearly with temperature, the resistance of the back-end-of-line metal wiring in the ITO/PET layer varies nearly linearly with temperature, and the resistance of the back-end-of-line metal wiring in the ITO/Al/PET layer varies nearly linearly with temperature.

As illustrated in FIG. 2A, the resistance of the back-end-of-line metal structure varies nearly linearly with the temperature.

The back-end-of-line metal structure is used to measure the intra-chip temperature of the chip by taking advantage of the characteristic that the resistance of the back-end-of-line structure varies nearly linearly with the temperature. For example, the power is supplied to the back-end-of-line metal structure, and the current and voltage of the back-end-of-line metal are measured, thereby calculating the resistance of the back-end-of-line metal structure according to the current and voltage of the back-end-of-line metal.

In the embodiment, the temperature sensing electrical signal, for example, may include a current and a voltage.

In some embodiments of the present disclosure, the control unit and the first sensing unit form a 4-wire Kelvin-based circuit to process the multi-temperature sensing electrical signal to output the measurement result.

The 4-wire Kelvin circuit includes 4 signal lines, which are respectively referred to as a high potential application line, a low potential application line, a high potential detection line, and a low potential detection line.

For example, for the back-end-of-line metal structure illustrated in FIG. 1B, FIG. 1C, and FIG. 1D, the back-end-of-line metal wiring includes 4 connections, VDD_MH, VDD_FH, VSS_ML, and VSS_FL. For example, the connection terminal VDD_MH is used to couple a high potential detection line to measure a high voltage. The connection terminal VDD_FH is used to couple a high potential application line to provide a high potential low current. The connection terminal VSS_FL is used to couple a low potential application line to provide a low potential low current. The connection terminal VSS_ML is used to couple a low potential detection line to measure a low voltage. Specifically, the working principle of the 4-wire Kelvin circuit is referred to the relevant materials, and is not repeated in the embodiments of the present disclosure.

As illustrated in FIG. 1B, FIG. 1C, and FIG. 1D, the distance between the connection terminal VDD_FL and the connection terminal VDD_FH is larger than or equal to the distance between the connection terminal VSS_ML and the connection terminal VSS_MH to implement a 4-wire Kelvin measurement. For example, the connection terminal VSS_FL and the connection terminal VDD_FH are respectively provided at two ends of the back-end-of-line metal structure that are farthest apart, so that the resistance of the back-end-of-line metal structure is measured accurately. The two ends of the back-end metal structure that are farthest apart, refer to the leading and trailing ends of the metal connection structure formed by the back-end metal structure, so that the resistance of the entire trace or pillar structure is included in the metal connection structure, which avoids that the resistance of the portion of the metal structure is not ignored to result in an inaccurate resistance measurement. As illustrated in FIG. 1D, a complete metal connection structure is formed by the metal wiring 101, the through-silicon via 150, the metal wiring 102, the through-silicon via 160, the metal wiring 103, the through-silicon via 170, the metal wiring 104, the through-silicon via 180 and the metal wiring 105. The metal connection structure has a leading end at the metal wiring 101 and a trailing end at the metal wiring 105, so the connection terminal VDD_FH and the connection terminal VDD_MH are provided at the metal wiring 105, and the connection terminal VSS_ML and the connection terminal VSS_FL are provided at the metal wiring 101.

The embodiments of the present disclosure use the temperature sensing unit of a metal type temperature sensor to replace the temperature sensing unit of a BJT-type temperature sensor, and use the characteristic that the resistance of the metal in BEOL in the back-end process has a stable shift with the temperature shift, which circumvents the fluctuation of the BJT manufacturing process in the front-end, and improves the inherent accuracy of the temperature sensing unit of the temperature sensor.

In some embodiments of the present disclosure, a chip includes at least one die. The first temperature sensing unit and the control unit are integrated in the same die of the at least one die; or the first temperature sensing unit is integrated in one of the at least one die and the control unit is independent of the at least one die.

Figure 2B:
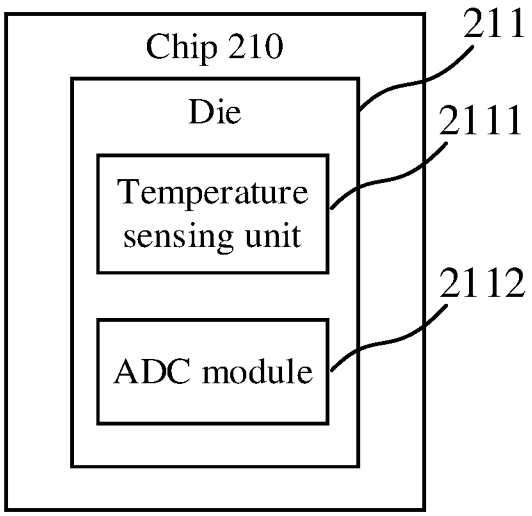
FIG. 2B illustrates a block schematic diagram of a chip provided by at least one embodiment of the present disclosure.

FIG. 2B illustrates a block schematic diagram of a chip provided by at least one embodiment of the present disclosure.

As illustrated in FIG. 2B, a chip 210 includes a die 211. The chip 210 includes a temperature sensor system, and the temperature sensor system includes a temperature sensing unit 2111 and an ADC module 2112, which are integrated in a die 211. The temperature sensing unit 2111 is an example of the first temperature sensing unit, and the ADC module 2112 is an example of the control unit.

In some embodiments of the present disclosure, the chip further includes a package portion. The first temperature sensing unit are integrated in one of the at least one die and the control unit is independent of the at least one die, including that the first temperature sensing unit is integrated in one of the at least one die and the control unit is provided in the package portion outside the die.

Figure 2C:
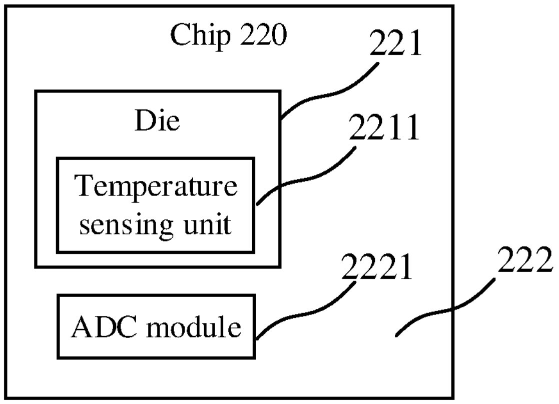
FIG. 2C illustrates a block schematic diagram of another chip provided by at least one embodiment of the present disclosure.

FIG. 2C illustrates a block schematic diagram of another chip provided by at least one embodiment of the present disclosure.

As illustrated in FIG. 2C, a chip 220 includes a die 221 and a package portion 222. The package portion is configured to package the chip 220. The temperature sensing unit 2211 is integrated in the die 221, and the ADC module 2221 is provided in the package portion 222 so as to be independent of the die 221. The temperature sensing unit 2211 is an example of the first temperature sensing unit, and the ADC module 2221 is an example of the control unit.

In some embodiments of the present disclosure, in the case where the chip includes a plurality of dies stacked by a bonding structure, the first temperature sensing unit is integrated in one of the at least one dies and the first temperature sensing unit is provided in the bonding structure.

Figure 2D:
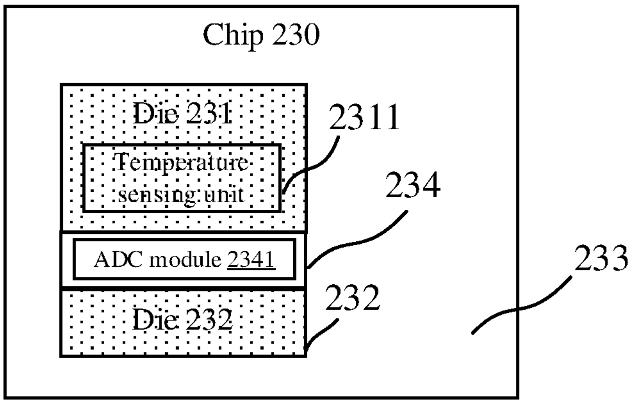
FIG. 2D illustrates a block schematic diagram of another chip provided by at least one embodiment of the present disclosure.

FIG. 2D illustrates a block schematic diagram of another chip provided by at least one embodiment of the present disclosure.

As illustrated in FIG. 2C, a chip 230 includes a die 231, a die 232, and a package portion 233. The die 231 and the die 232 are stacked by a bonding structure 234, the bonding structure 234 is configured to bond the die 231 and the die 232 together.

The temperature sensing unit 2311 is integrated in the die 231. The ADC module 2341 is provided in the bonding structure 234, which is independent of the die 231 and the die 232.

In some embodiments of the present disclosure, the temperature sensor system includes a plurality of temperature sensing units, and the plurality of temperature sensing units include the first temperature sensing unit. The temperature sensor system further includes a multiplexer, which is coupled with the control unit and the plurality of temperature sensing units, and is configured to select one of the plurality of temperature sensing units.

For example, the temperature sensor system includes a back-end-of-line metal wiring that is provided at a plurality of positions. The back-end-of-line metal wiring of the plurality of positions serves as a plurality of temperature sensing units.

The multiplexer couples the plurality of temperature sensing units to implement the power supply and switching for the plurality of temperature sensing units.

Figure 3:
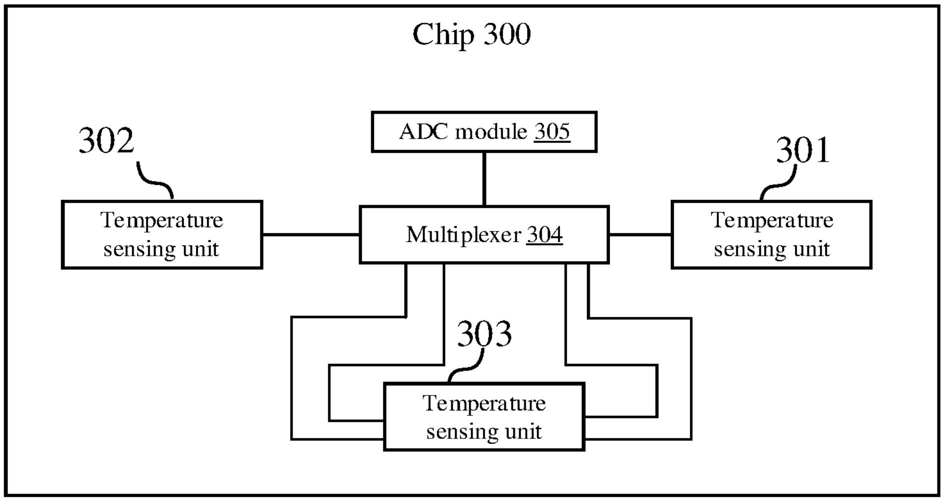
FIG. 3 illustrates a schematic diagram of a coupling relationship of a multiplexer and a temperature sensing unit provided by at least one embodiment of the present disclosure.

FIG. 3 illustrates a schematic diagram of a coupling relationship between a multiplexer and a temperature sensing unit provided by at least one embodiment of the present disclosure.

As illustrated in FIG. 3, the chip 300 includes a temperature sensing unit 301, a temperature sensing unit 302, and a temperature sensing unit 303. The temperature sensing unit 301, the temperature sensing unit 302, and the temperature sensing unit 303 are all coupled with a multiplexer 304. The multiplexer 304 is coupled with the ADC module 305.

The multiplexer 304 is configured to select one of the temperature sensing units 301, 302, and 303 to conduct with the ADC module 305. As illustrated in FIG. 3, for example, the multiplexer 304 selects the temperature sensing unit 303 to conduct with the ADC module 305. As illustrated in FIG. 3, the ADC module 305 forms a 4-wire Kelvin circuit with the temperature sensing unit 303 and the multiplexer 304, so that the ADC module 305 applies a high potential low current and a low potential low current to the temperature sensing unit 303 through a high potential application line and a low potential application line, respectively, and detects the voltage of the temperature sensing unit through a high potential detection line and a low potential detection line.

The 4-wire Kelvin makes the measurement of the resistance more accurate, thereby increasing the measurement accuracy of the temperature.

In some embodiments of the present disclosure, the at least one die includes the plurality of dies. The multiplexer and the first temperature sensing unit are provided in the same die or are not provided in the same die.

For example, in the example of FIG. 2D, the temperature sensing unit 2311 is provided in the die 231, the multiplexer can be provided in the die 231, or the multiplexer can be provided in the bonding structure 234.

In some embodiments of the present disclosure, for example, each die may include the plurality of temperature sensing units, then each die may include a multiplexer to select one of the plurality of temperature sensing units to conduct with the ADC module.

Figure 4:
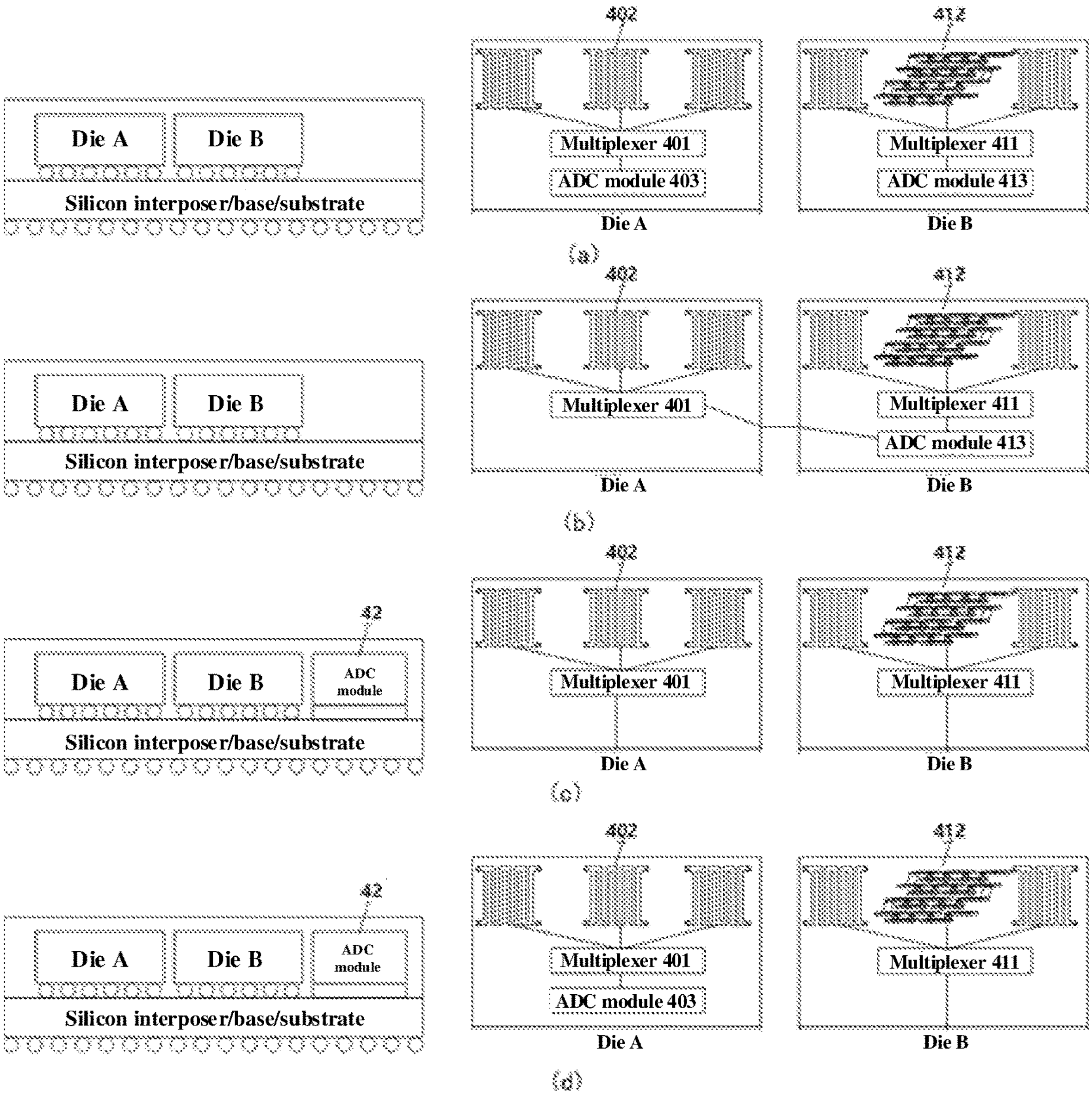
FIG. 4 illustrates a schematic diagram of a temperature sensor system provided by at least one embodiment of the present disclosure.

FIG. 4 illustrates a schematic diagram of a temperature sensor system provided by at least one embodiment of the present disclosure.

In the example of FIG. 4, the chip includes the plurality of dies that are packaged in a 2.5 D package form. In the embodiments of the present disclosure, a package form in which the plurality of dies are juxtaposed on a silicon interposer, substrate, or base is referred to as a 2.5 D package. For example, in some embodiments of FIG. 4, a die A and a die B are juxtaposed on a silicon interposer, substrate, or base. FIG. 4 illustrates the embodiment of 4 temperature sensor systems provided by the present disclosure. A chip including the die A and the die B is taken as an example to illustrate the embodiment of the 4 temperature sensor systems.

As illustrated in the example of FIG. 4 (*a*), in some embodiments of the present disclosure, the die A and the die B respectively have built-in multi-path sensors and ADC modules. The multiplexer 401 of the die A is coupled with at least one temperature sensing unit 402 of the die A, e.g., at least one back-end-of-line metal structure, and is further coupled with the ADC module 403 built in the die A. Similarly, the multiplexer 411 of the die B is coupled with at least one temperature sensing unit 412 of the die B, e.g., at least one back-end-of-line metal structure, and is further coupled with the ADC module 413 built in the die B.

In some embodiments of the present disclosure, in the case where the first temperature sensing unit and the control unit are respectively integrated in different dies of the at least one die, the first temperature sensing unit is provided in the first die and the control unit is provided in the second die. The multiplexer in the first die is coupled with the control unit through an interconnect structure, and the interconnection structure is configured to couple the first die and the second die.

For example, in the example of FIG. 4 (*b*), the first temperature sensing unit is, for example, the temperature sensing unit in the die A, e.g., the die A is an example of the first die. The control unit is provided in the die B, e.g., the die B is an example of the second die.

The die A has a built-in multiplexer 401, but does not has a built-in ADC module. The die B has a built-in multiplex sensor 411 and a built-in ADC module 413. The multiplexer 401 of the die A is coupled with at least one temperature sensing unit 402 in the die A, and is further coupled with the ADC module 413 in the die B. For example, the multiplexer 401 in the die A is coupled with the ADC module 413 in the die B through an interconnect structure. For example, the die A and the die B are coupled through an inter-chip interconnect circuit structure. Those skilled in the art may use the circuit structure in the art to couple the die A and the die B, so that the die A and the die B communicate with each other.

The multiplexer 411 of the die B is coupled with at least one temperature sensing unit 412 in the die B, and is further coupled with an ADC module 413 built in the die B.

In some embodiments of the present disclosure, in the case where the temperature sensing unit (e.g., the first temperature sensing unit) is integrated in one of the at least one die and the control unit is independent of the at least one die, the multiplexer is coupled with the control unit through a package circuit structure of the first die.

For example, in the example of FIG. 4 (*c*), the ADC module 42 is independent of any die in the chip (die A and die B). The die A integrates the temperature sensing unit 402 and the multiplexer 401, and the die B integrates the temperature sensing unit 412 and the multiplexer 411. The multiplexer 401 of the die A is coupled with the plurality of temperature sensing units 402 in the die A, and the multiplexer 411 of the die B is coupled with the plurality of temperature sensing units 412 in the die B. The multiplexer 401 in the die A and the multiplexer 411 in the die B are respectively coupled with the sealed ADC module 42 through a package circuit structure. The sealed ADC module 42 refers to an ADC module that the die A and the die B are sealed in the same chip. In the example, the die A and die B are both examples of the first die. The first die is packaged through a package circuit structure. For example, the first die includes a signal output port, the multiplexer is coupled with the signal output port, and the signal output port is coupled with the package circuit structure, so that the multiplexer is coupled with the control unit.

For example, in the example of FIG. 4 (*d*), the chip includes one ADC module 43 that is independent of any die in the chip. In addition to the ADC module 43, the chip further includes another ADC module 403 that is integrated in the die A, e.g., the die A has a built-in ADC module 403 and a built-in multiplexer 401, and the multiplexer 401 is coupled with the plurality of temperature sensing units 402. The die B has a built-in multiplexer 411, but does not have a built-in ADC module, and thus, the multiplexer 411 in the die B may be coupled with the sealed ADC module 43 through a package circuit structure.

In the examples of FIGS. 4 (*c*) and (*d*), the ADC module is integrated in the package portion of the chip and is connected to the temperature sensing unit in the die through a multiplexer, which can reduce the area occupied by the ADC module in the die and improve the performance, power consumption and area (Performance-Power-Area, PPA) of the chip. Moreover, the ADC module is integrated in the package portion of the chip and is connected to the temperature sensing unit in the die through the multiplexer, so that the measurement accuracy of the ADC module is not limited by the area limitation of the ADC module in the die, which is beneficial to improve the resolution of the temperature measurement.

Figure 5:
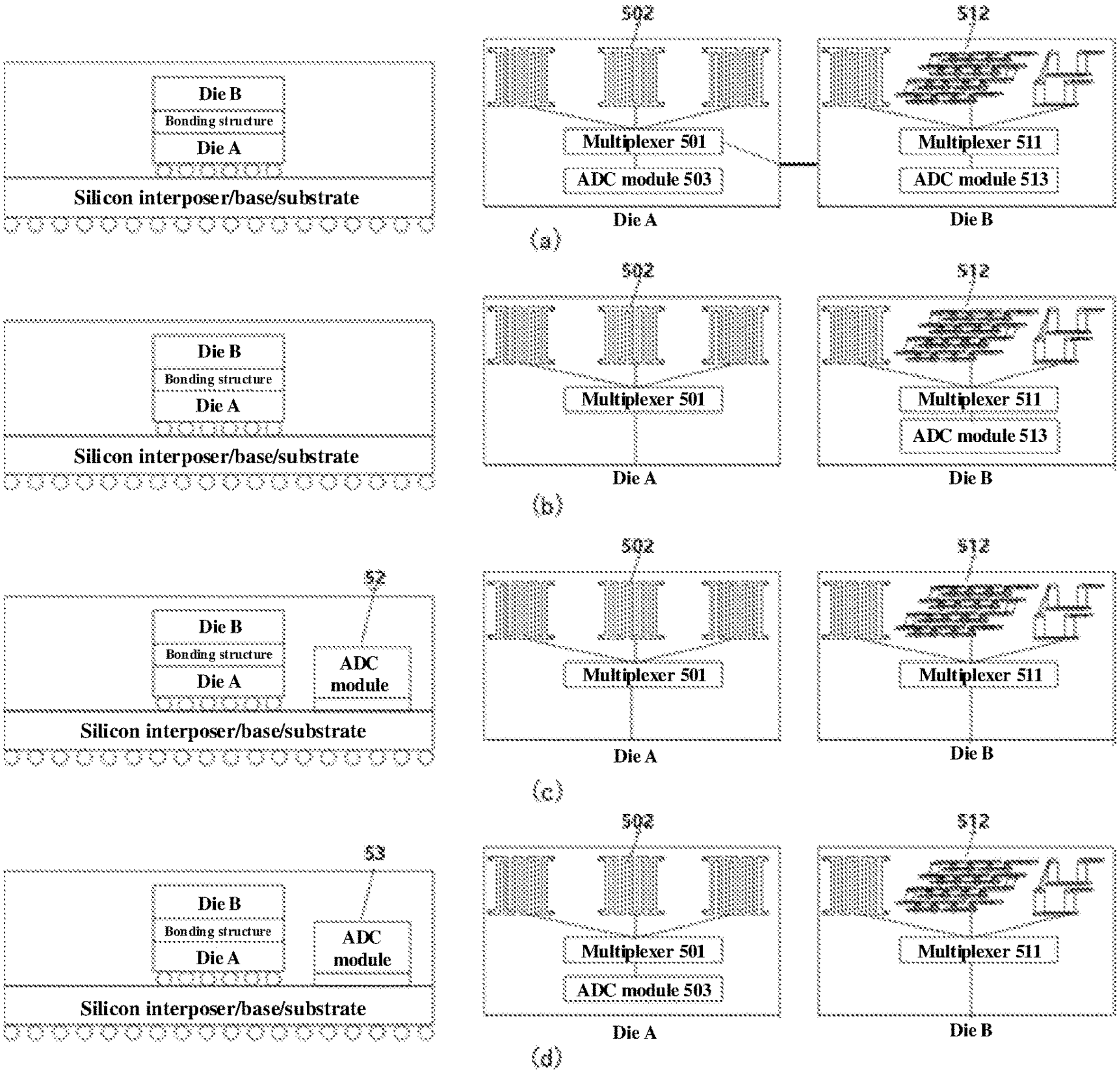
FIG. 5 illustrates a schematic diagram of a temperature sensor system provided by at least one embodiment of the present disclosure.

FIG. 5 illustrates a schematic diagram of a temperature sensor system provided by at least one embodiment of the present disclosure.

In the example of FIG. 5, the chip includes the plurality of dies that are bonded together through a bonding structure, and the structure in which the plurality of dies are stacked as illustrated in FIG. 5 is referred to as a 3D chip in the present disclosure. FIG. 5 illustrates 4 embodiments of a temperature sensor system in the chip of the plurality of dies provided by the present disclosure, wherein the plurality of dies are bonded together through the bonding structure. As illustrated in FIG. 5, the die A and the die B are bonded together through the bonding structure.

As illustrated in the example of FIG. 5 (*a*), in some embodiments of the present disclosure, the die A and the die B respectively have built-in multi-path sensors and ADC modules. The multiplexer 501 in the die A is coupled with at least one temperature sensing unit 502 in the die A, and is further coupled with an ADC module 503 built in the die A. Similarly, the multiplexer 511 in the die B is coupled with at least one temperature sensing unit 512 in the die B and is further coupled with an ADC module 513 built in the die B.

In some embodiments of the present disclosure, in a case where the first temperature sensing unit and the control unit are respectively integrated in different dies of the at least one die, the first temperature sensing unit is provided in the first die and the control unit is provided in the second die. The multiplexer in the first die is coupled with the control unit through a bonding structure.

For example, in the example of FIG. 5 (*b*), for example, the second die is the die A that is immediately adjacent to the underlying substrate, and the first die is the die B that is stacked on a side of the second die away from the underlying substrate. The first temperature sensing unit is, for example, the temperature sensing unit 502 in the die A, e.g., the die A is an example of the second die. The control unit is provided in the die B, e.g., the die B is an example of the first die.

The die A has a built-in multiplexer 501, but does not have a built-in ADC module. The die B has a built-in multiplex sensor 511 and a built-in ADC module 513. The multiplexer 501 in the die A is coupled with at least one temperature sensing unit 502 in the die A, and is further coupled with the ADC module 513 in the die B. For example, the multiplexer 501 in the die A is coupled with the ADC module 513 in the B through a bonding structure. For example, the multiplexer 501 in the die A and the ADC module 513 in the die B are coupled through a circuit structure in the bonding structure. The present disclosure does not limit the circuit structure in the bonding structure, and those of ordinary skill in the art can self-design the circuit structure in the bonding structure so that the multiplexer 501 in the die A and the ADC module 513 in the die B are coupled.

The multiplexer in the die B are coupled with at least one temperature sensing unit in the die B and is further coupled with the ADC module built in the die B.

In some embodiments of the present disclosure, the first die and the second die are stacked through a bonding structure and are packaged through a package circuit structure. The second die includes a signal output port, the first die does not include a signal output port, the multiplexer is coupled with the signal output port through the bonding structure, and the control unit is coupled with the package circuit structure through the signal output port.

In the example of FIG. 5 (*b*), by integrating the ADC module in the die B in the 3D chip and connecting the ADC module with the temperature sensing unit in the die A, the area occupied by the ADC module in the die A can be reduced, and the PPA performance, power consumption, and area of the die A are improved. Moreover, the die A may provide a larger area to design a higher-precision ADC module, and improve the resolution of the temperature measurement.

For example, in the example of FIG. 5 (*c*), the ADC module 52 is independent of any die in the chip (die A and die B). The die A integrates a temperature sensing unit 502 and a multiplexer 501, and the die B integrates a temperature sensing unit 512 and a multiplexer 511. The multiplexer 501 in the die B is coupled with the signal output port in the die A through the bonding structure, coupled with the package circuit structure through the signal output port in the die A, and coupled with the sealed ADC module 52 through the package circuit structure. The multiplexer 501 in the die A is coupled with temperature sensing units 502 in the die A through the package circuit structure, and is coupled to the sealed ADC module 52 through the package circuit structure.

For example, the die A includes a signal output port and the die B does not include a signal output port, e.g. in the example, the die B is an example of the first die and the die A is an example of the second die. The multiplexer 511 in the die B is coupled with the signal output port in the die A through the bonding structure, coupled with the package circuit structure through the signal output port in the die A, and coupled with the sealed ADC module 52 through the package circuit structure. The multiplexer 501 in the die A is coupled to the package circuit structure through its own signal output port, and is coupled to the sealed ADC module 52 through the package circuit structure.

In the example, the first die (e.g., die B) and the second die (e.g., die A) are packaged through a package circuit structure, and the ADC module 52 is sealed with the first and second dies that are packaged.

In the example of FIG. 5 (*c*), the ADC module 52 is independent of the die A and die B, which reduces the area occupied by the ADC module in the die A and die B, and improves the performance, power consumption, and area of the die A and die B. Moreover, the die A and die B can provide a larger area design for a higher-precision ADC module, and improves the resolution of the temperature measurement.

For example, in the example of FIG. 5 (*d*), the chip includes an ADC module 53 that is independent of any die in the chip. In addition to the ADC module 53, the chip further includes an ADC module 503 integrated in the die A. That is, the die A has a built-in ADC module 503 and a built-in multiplexer 501. The multiplexer 501 is coupled with a plurality of temperature sensing units 502. The die B has a built-in multiplexer 511, but does not have a built-in ADC module, so the multiplexer 511 in the die B can be coupled with the signal output port in the die A through the bonding circuit structure, and be coupled with the control unit through the signal output port and the package circuit structure. The ADC module 503 is configured to process the temperature sensing signal output by the temperature sensing unit 502 in the die A to obtain a measurement result. The ADC module 53 is configured to process the temperature sensing signal output by the temperature sensing unit 512 in the die B to obtain a measurement result.

In the example of FIG. 5 (*d*), by integrating the ADC module in the die A in the 3D chip, and connecting the ADC module with the temperature sensing unit in the die B, the area occupied by the ADC module in the die B is reduced, and the performance, power consumption, and area of the die B are improved. Moreover, the die B may provide a larger arca to design a higher-precision ADC module, and improve the resolution of the temperature measurement.

In some embodiments of the present disclosure, the temperature sensing unit is provided in the bonding structure. In the case where the temperature sensing unit is provided in the bonded structure, the control unit (e.g., ADC module) may be provided in the first die (e.g., die A) or the second die (e.g., die B), and the multiplexer and the control unit are provided in the same die. For example, the ADC module may be provided in the first die, and the multiplexer may also be provided in the first die.

In other embodiments of the present disclosure, the control unit is independent of the first die and the second die, the second die includes a signal output port, the multiplexer is provided in the second die, the signal output port is coupled with the package circuit structure, the multiplexer is coupled with the signal output port, and the signal output port is coupled with the package circuit structure so that the multiplexer is coupled with the control unit through the package circuit structure.

For example, in the structure illustrated in FIG. 5(*d*), a temperature sensing unit is included in the bonding structure. The second die is the die A that is immediately adjacent to the underlying substrate, and the first die is the die B that is stacked on a side of the second die away from the underlying substrate. The die A includes a signal output port, a multiplexer is provided in the die A, and the multiplexer is coupled with the temperature sensing unit in the bonding structure. The signal output port is coupled with the package circuit structure, the multiplexer is coupled with the signal output port, and the signal output port is coupled with the package circuit structure so that the multiplexer is coupled with the control unit through the package circuit structure.

The embodiment provides a temperature sensing unit in the bonding structure so that the temperature in the bonding structure can be monitored.

In another aspect, the present disclosure provides a chip, which includes the temperature sensor system of any one provided by the above embodiments. The chip has a high temperature measurement accuracy.

Figure 6:
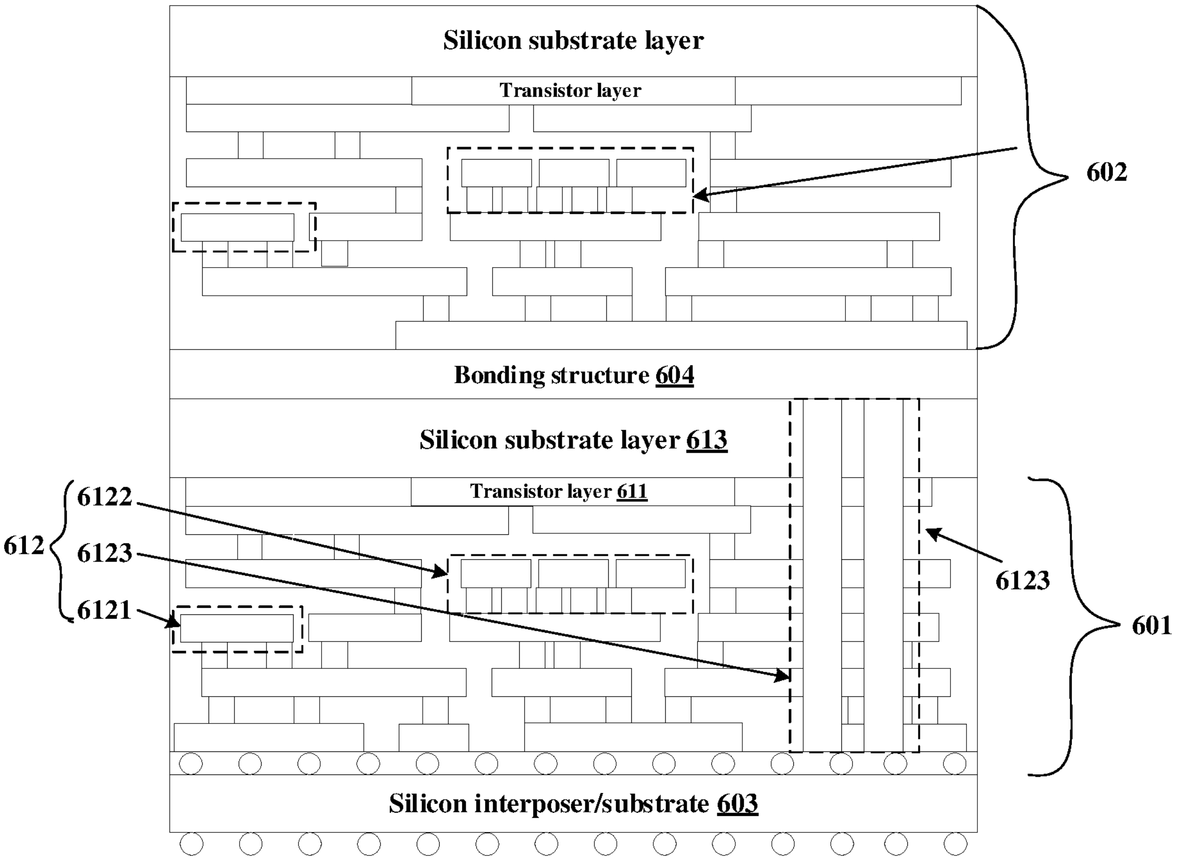
FIG. 6 illustrates a structural schematic diagram of a chip provided by at least one embodiment of the present disclosure.

FIG. 6 illustrates a structural schematic diagram of a chip provided by at least one embodiment of the present disclosure.

As illustrated in FIG. 6, the chip includes the die 601 and die 602 that are stacked by the bonding structure 604. The die 601 is formed on a silicon interposer, base, or substrate 603. The die 602 is provided on a side of the die 601 away from the silicon interposer or the substrate.

As illustrated in FIG. 6, the die 601 includes a transistor layer 611 (also referred to as a "lower layer") formed by a front-end-of-line process, a back-end-of-line metal structure 612 (also referred to as a "higher layer") formed by a back-end-of-line process, and a silicon substrate layer 613. The silicon substrate layer is the non-circuit layer of the chip. FIG. 6 is an inverted placement of the chip.

As illustrated in FIG. 6, the back-end-of-line metal structure 612 in the die 601 includes a back-end-of-line metal wiring 6121, a metal structure 6122 formed with a back-end-of-line metal via array and the back-end-of-line metal wiring, and a metal structure 6123 formed with a back-end-of-line metal wiring and a via array through the silicon substrate.

The metal structure 6122 formed with the back-end-of-line metal wiring 6121, the back-end-of-line metal via array and the back-end-of-line metal wiring, and the metal structure 6123 formed with the back-end-of-line metal wiring and the via array through the silicon substrate are respectively configured to sense the temperature at different positions in the die 601.

The structure of the die 602 is similar to that of the die 601, which is not repeated.

There are several points to be noted:

(1) The drawings of the embodiments of the present disclosure relate only to the structures to which the embodiments of the present disclosure relate, and other structures may refer to general designs.

(2) Without conflict, the embodiments of the present disclosure and the characteristics in the embodiments may be combined with each other to obtain a new embodiment.

The above description is only the specific embodiments of the present disclosure, but the protection scope of the present disclosure is not limited to the description, and the protection scope of the present disclosure is determined by the appended claims.

The invention claimed is:

1. A temperature sensor system in a chip, comprising:

a first temperature sensing unit, sensing a temperature by using a back-end-of-line metal structure formed in a back-end-of-line process of the chip to output a temperature sensing electrical signal, wherein the back-end-of-line metal structure comprises a resistive structure formed of a single conductive material, and the temperature sensing electrical signal is generated based on a variation in resistance of the back-end-of-line metal structure with temperature; and a control unit, coupled with the first temperature sensing unit and forming a 4-wire Kelvin-based circuit with the first temperature sensing unit, and processing the temperature sensing electrical signal output by the first temperature sensing unit to output a measurement result, wherein the 4-wire Kelvin-based circuit comprises connection terminals provided at ends of the back-end-of-line metal structure that are farthest apart so as to measure a resistance of substantially the entire back-end-of-line metal structure.

2. The temperature sensor system of claim 1, wherein the chip comprises at least one die, the first temperature sensing unit and the control unit are integrated in a same die of the at least one die; and the first temperature sensing unit is integrated in one of the at least one die and the control unit is independent of the at least one die.

3. The temperature sensor system of claim 2, wherein the chip further comprises a package portion, the first temperature sensing unit being integrated in one of the at least one die and the control unit being independent of the at least one die, comprises:

the first temperature sensing unit being integrated in one of the at least one die and the control unit being provided in the package portion outside the die; or in a case where the chip comprises a plurality of the dies stacked through a bonding structure, the first temperature sensing unit being integrated in one of the at least one die and the first temperature sensing unit being provided in the bonding structure.

4. The temperature sensor system of claim 3, wherein the temperature sensor system comprises a plurality of the temperature sensing units, and the plurality of the temperature sensing units comprise the first temperature sensing unit; and the temperature sensor system further comprises:

a multiplexer, coupled with the control unit and the plurality of the temperature sensing units, and configured to select one of the plurality of the temperature sensing units.

5. The temperature sensor system of claim 4, wherein the at least one die comprises a plurality of the dies, the multiplexer and the first temperature sensing unit are provided in a same die or are not provided in the same die.

6. The temperature sensor system of claim 4, wherein the at least one die comprises a first die, the multiplexer is provided in the first die, in a case where the first temperature sensing unit is integrated in one of the at least one die and the control unit is independent of the at least one die, the multiplexer is coupled with the control unit through a package circuit structure of the first die.

7. The temperature sensor system of claim 6, wherein the first die comprises a signal output port, the multiplexer is coupled with the signal output port, and the signal output port is coupled with the package circuit structure so that the multiplexer is coupled with the control unit.

8. The temperature sensor system of claim 6, wherein the at least one die further comprises a second die, the first die and the second die are stacked through a bonding structure and are packaged through the package circuit structure, the second die comprises a signal output port, the first die does not comprise a signal output port, the multiplexer is coupled with the signal output port through the bonding structure, and the control unit is coupled with the package circuit structure through the signal output port.

9. The temperature sensor system of claim 4, wherein the at least one die comprises a first die and a second die, in a case where the first temperature sensing unit and the control unit are respectively integrated in different dies of the at least one die:

the first temperature sensing unit is provided in the first die, and the control unit is provided in the second die, a multiplexer in the first die is coupled with the control unit through an interconnect structure, wherein the interconnect structure is configured to couple the first die and the second die; or the multiplexer in the first die is coupled with the control unit through a bonding structure, wherein the bonding structure is configured to stack the first die and the second die.

10. The temperature sensor system of claim 1, wherein the chip comprises a first die and a second die, in a case where the first temperature sensing unit is provided in a bonding structure, the control unit is provided in the first die or the second die, and a multiplexer and the control unit are provided in a same die; or the control unit is independent of the first die and the second die, the second die comprises a signal output port, the multiplexer is provided in the second die, the signal output port is coupled with a package circuit structure, the multiplexer is coupled with the signal output port, and the signal output port is coupled with the package circuit structure, so that the multiplexer is coupled with the control unit through the package circuit structure.

11. The temperature sensor system of claim 1, wherein the back-end-of-line metal structure comprises at least one selected from the group consisting of:

a back-end-of-line metal wiring, a metal structure formed of a back-end-of-line metal via array and the back-end-of-line metal wiring, and a metal structure formed of the back-end-of-line metal wiring and a via array through a silicon substrate.

12. The temperature sensor system of claim 1, wherein the control unit and the first temperature sensing unit form a 4-wire Kelvin-based circuit to process the temperature sensing electrical signal to output the measurement result.

13. A chip, comprising:

a temperature sensor system, wherein the temperature sensor system comprises:

a first temperature sensing unit, sensing a temperature by using a back-end-of-line metal structure formed in a back-end-of-line process of the chip to output a temperature sensing electrical signal, wherein the back-end-of-line metal structure comprises a resistive structure formed of a single conductive material, and the temperature sensing electrical signal is generated based on a variation in resistance of the back-end-of-line metal structure with temperature; and a control unit, coupled with the first temperature sensing unit and forming a 4-wire Kelvin-based circuit with the first temperature sensing unit, and processing the temperature sensing electrical signal output by the first temperature sensing unit to output a measurement result, wherein the 4-wire Kelvin-based circuit comprises connection terminals provided at ends of the back-end-of-line metal structure that are farthest apart so as to measure a resistance of substantially the entire back-end-of-line metal structure.

14. The chip of claim 13, further comprising at least one die, wherein the first temperature sensing unit and the control unit are integrated in a same die of the at least one die;

the first temperature sensing unit is integrated in one of the at least one die and the control unit is independent of the at least one die.

15. The chip of claim 14, further comprising a package portion, wherein the first temperature sensing unit being integrated in one of the at least one die and the control unit being independent of the at least one die, comprises:

the first temperature sensing unit being integrated in one of the at least one die and the control unit being provided in the package portion outside the die; or in a case where the chip comprises a plurality of the dies stacked through a bonding structure, the first temperature sensing unit being integrated in one of the at least one die and the first temperature sensing unit being provided in the bonding structure.

16. The chip of claim 15, wherein the temperature sensor system comprises a plurality of the temperature sensing units, and the plurality of the temperature sensing units comprise the first temperature sensing unit; and the temperature sensor system further comprises:

a multiplexer, coupled with the control unit and the plurality of the temperature sensing units, and configured to select one of the plurality of the temperature sensing units.

17. The chip of claim 16, wherein the at least one die comprises a plurality of the dies, wherein the multiplexer and the first temperature sensing unit are provided in a same die or are not provided in the same die.

18. The chip of claim 16, wherein the at least one die comprises a first die, the multiplexer is provided in the first die, in a case where the first temperature sensing unit is integrated in one of the at least one die and the control unit is independent of the at least one die, the multiplexer is coupled with the control unit through a package circuit structure of the first die.

19. The chip of claim 16, wherein the at least one die comprises a first die and a second die, in a case where the first temperature sensing unit and the control unit are respectively integrated in different dies of the at least one die:

the first temperature sensing unit is provided in the first die, and the control unit is provided in the second die, a multiplexer in the first die is coupled with the control unit through an interconnect structure, wherein the interconnect structure is configured to couple the first die and the second die; or the multiplexer in the first die is coupled with the control unit through a bonding structure, wherein the bonding structure is configured to stack the first die and the second die.

20. The chip of claim 13, comprising a first die and a second die, wherein in a case where the first temperature sensing unit is provided in a bonding structure, the control unit is provided in the first die or the second die, and a multiplexer and the control unit are provided in a same die; or the control unit is independent of the first die and the second die, the second die comprises a signal output port, the multiplexer is provided in the second die, the signal output port is coupled with a package circuit structure, the multiplexer is coupled with the signal output port, and the signal output port is coupled with the package circuit structure, so that the multiplexer is coupled with the control unit through the package circuit structure.

* * * * *